United States Patent
Van Der Velde et al.

(10) Patent No.: US 12,477,450 B2
(45) Date of Patent: Nov. 18, 2025

(54) TELECOMMUNICATION SYSTEMS

(71) Applicant: Samsung Electronics Co., Ltd., Gyeonggi-do (KR)

(72) Inventors: Himke Van Der Velde, Gyeonggi-do (KR); Sangyeob Jung, Gyeonggi-do (KR); Hyunjeong Kang, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 158 days.

(21) Appl. No.: 17/923,389

(22) PCT Filed: May 20, 2021

(86) PCT No.: PCT/KR2021/006293
§ 371 (c)(1),
(2) Date: Nov. 4, 2022

(87) PCT Pub. No.: WO2021/235872
PCT Pub. Date: Nov. 25, 2021

(65) Prior Publication Data
US 2023/0199631 A1    Jun. 22, 2023

(30) Foreign Application Priority Data

May 20, 2020  (GB) ..................................... 2007528
May 19, 2021  (GB) ..................................... 2107134

(51) Int. Cl.
*H04W 48/18*  (2009.01)
*H04W 4/06*   (2009.01)
(Continued)

(52) U.S. Cl.
CPC .............. *H04W 48/18* (2013.01); *H04W 4/06* (2013.01); *H04W 48/10* (2013.01); *H04W 84/042* (2013.01)

(58) Field of Classification Search
CPC ..... H04W 48/10; H04W 48/12; H04W 48/18; H04W 76/15; H04W 76/16; H04W 76/19
See application file for complete search history.

(56) References Cited

U.S. PATENT DOCUMENTS 6,819,923 B1    11/2004   Friman
2006/0166694 A1  7/2006   Jeong et al.
(Continued)

FOREIGN PATENT DOCUMENTS

WO    WO 00/36853       6/2000
WO    WO 2019/105056    6/2019

OTHER PUBLICATIONS

LG Electronics Inc., "Provision of WLAN Identifiers", R2-145198, 3GPP TSG-RAN2 Meeting #88, Nov. 17-21, 2014, 2 pages.
(Continued)

*Primary Examiner* — Pao Sinkantarakorn
(74) *Attorney, Agent, or Firm* — The Farrell Law Firm, P.C.

(57) ABSTRACT

Disclosed is a method of managing a system information parameter, broadcast by an LTE cell of a network on which a User Equipment, UE, is camping, wherein the system information parameter indicates New Radio, NR, frequency bands available for use in an EN-DC configuration, which in a case of network sharing, may be different for each of at least one sharing PLMN, and whereby the system information parameter includes an entry for each of the at least one PLMN that contains the actual NR frequency bands if: sharing is employed for the concerned serving cell; and the NR bands for which the network supports EN-DC is not the same for all of the multiple sharing PLMNs, and wherein the contents of the system information parameter is not signalled if condition a) or b) is not true.

16 Claims, 8 Drawing Sheets

```
SystemInformationBlockType26a-r16 ::= SEQUENCE {
    plmn-InfoList-r16            PLMN-InfoList-r16,
    bandListENDC-r16             BandListENDC-r16,
    lateNonCriticalExtension     OCTET STRING    OPTIONAL,
    ...
}

BandListENDC-r16 ::= SEQUENCE (SIZE (1.. maxBandsENDC-r16)) OF FreqBandIndicatorNR
```

(51) Int. Cl.
*H04W 48/10* (2009.01)
*H04W 84/04* (2009.01)

(56) References Cited

U.S. PATENT DOCUMENTS

| | | | |
|---|---|---|---|
| 2019/0215839 A1 | 7/2019 | Serravalle et al. | |
| 2019/0335446 A1* | 10/2019 | Guha | H04W 72/21 |
| 2020/0100315 A1 | 3/2020 | Jia et al. | |
| 2020/0187209 A1* | 6/2020 | Tamura | H04W 72/0453 |
| 2020/0275361 A1* | 8/2020 | Ohlsson | H04W 48/18 |
| 2020/0351967 A1 | 11/2020 | Lei et al. | |
| 2021/0266801 A1* | 8/2021 | Shah | H04B 17/336 |

OTHER PUBLICATIONS

Huawei, HiSilicon, "Further Discussion on Inter-RAT Resource Allocation", R2-1913704, 3GPP TSG-RAN WG2 Meeting#107bis, Oct. 14-18, 2019, 7 pages.
European Search Report dated Nov. 23, 2023 issued in counterpart application No. 21809868.9-1216, 24 pages.
PCT/ISA/210 Search Report issued on PCT/KR2021/006293, Oct. 14, 2021 pp. 5.
PCT/ISA/237 Written Opinion issued on PCT/KR2021/006293, Oct. 14, 2021, pp. 5.
Samsung, "Support of 5G indicator in EN-DC", R2-2001576, 3GPP TSG-RAN WG2 Meeting #109-e, Electronic meeting, Feb. 14, 2020, pp. 4.
3GPP Draft; R2-1910312—On inter-RAT scheduling, vol. RAN WG2, No. Prague, Czech; Aug. 26, 2019-Aug. 30, 2019,2019, Ericsson, "On inter—RAT scheduling", Aug. 15, 2019, pp. 3.
3GPP Draft; R2-2003843, vol. RAN WG2, No. eMeeting; Apr. 20, 2020-Apr. 30, 2020,2020, Samsung, "[ATI0ge][066][RI6] R16 LTE RRC coordination (Samsung)", May 1, 2020, pp. 15.
3GPP Draft; R2-1912067—Discussion on SL-related Uu-RRC messages, vol. RAN WG2, No. Chongqing, China; Oct. 14, 2019-Oct. 18, 2019,2019, OPPO, "Discussion on SL-related Uu-RRC message", Oct. 3, 2019, pp. 7.
3GPP Draft; R1-1910701, vol. RAN WGI, No. Chongqing, China; Oct. 14, 2019-Oct. 20, 2019,2019, Futurewei, "Support of NR Uu controlling L TE sidelink", Oct. 4, 2019, pp. 4.
3GPP TSG-RAN WG2 Meeting #109bis Electronic, R2-2004264, Apr. 20-30, 2020, "upperLayerIndication enhancements", May 8, 2020, pp. 13.
Search and Examination Report issued in counterpart Application No. GB2107134.5 dated Nov. 9, 2021, 7 pages.
Search and Examination Report issued in counterpart Application No. GB2107134.5 dated Oct. 12, 2022, 10 pages.
Huawei et al., "EN-DC Bandlist for 5G Indicator", R2-2003420, 3GPP TSG-RAN WG2 Meeting 109bis-e, Apr. 20-30, 2020, 3 pages.
Samsung, "Summary Report of [AT110-e] [206] [LTE ASN1] LTE General ASN.1 Discussion (Samsung)", R2-2005752, 3GPP TSG-RAN WG2#110 eMeeting, Apr. 20-30, 2020, 10 pages.
Samsung, Encoding of 5G Indicator (S191), R2-2005290, 3GPP TSG-RAN2 Meeting #110-e, Jun. 1-12, 2020, 3 pages.
European Search Report dated Jul. 28, 2023 issued in counterpart application No. 21809868.9-1216, 20 pages.

* cited by examiner

```
SystemInformationBlockType2 ::=    SEQUENCE {
-- irrelevant parts omitted
    plmn-InfoList-r15              PLMN-InfoList-r15        OPTIONAL    --Need OP
}

PLMN-InfoList-r15 ::= SEQUENCE (SIZE (1..maxPLMN-r11)) OF PLMN-Info-r15

PLMN-Info-r15 ::=   SEQUENCE {
    upperLayerIndication-r15       ENUMERATED (true)        OPTIONAL    --Need OR
}
```

FIG. 3

```
SystemInformationBlockType26a-r16 ::= SEQUENCE {
    plmn-InfoList-r16              PLMN-InfoList-r16,
    bandListENDC-r16               BandListENDC-r16,
    lateNonCriticalExtension       OCTET STRING    OPTIONAL,
    ...
}

BandListENDC-r16 ::= SEQUENCE (SIZE (1.. maxBandsENDC-r16)) OF FreqBandIndicatorNR
```

```
RRCConnectionReconfiguration-v1610-IEs ::= SEQUENCE {
    conditionalReconfiguration-r16    ConditionalReconfiguration-r16    OPTIONAL, -- Need ON
    daps-SourceRelease-r16            ENUMERATED{ true }                OPTIONAL, -- Need ON
    tdm-PatternConfig2-r16            TDM-PatternConfig-r15             OPTIONAL, -- Need ON
    >sl-ConfigDedicatedForNR-r16      OCTET STRING                      OPTIONAL, -- Need OR
    >sl-SSB-PriorityEUTRA-r16         INTEGER (1..8)                    OPTIONAL, -- Need OR
    nonCriticalExtension              SEQUENCE {}                       OPTIONAL
}
```

TELECOMMUNICATION SYSTEMS

PRIORITY

This application is a National Phase Entry of PCT International Application No. PCT/KR2021/006293, which was filed on May 20, 2021, and claims priority to United Kingdom Patent Application Nos. 2007528.9 and 2107134.5, which were filed on May 20, 2020 and May 19, 2021, respectively, the entire content of each of which is incorporated herein by reference.

TECHNICAL FIELD

The disclosure relates to a wireless communication system, and to a method and an apparatus for improving in and relating to telecommunication systems.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (COMP), reception-end interference cancellation and the like. In the 5G system, Hybrid FSK and QAM Modulation (FQAM) and sliding window su-perposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT en-vironment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

A first aspect of the present invention relates to the so-called 5G indicator, which relates to broadcast signalling by means of which a serving network is able to inform a User Equipment, UE, that camps on an E-UTRA cell about New Radio, NR, frequency bands for which E-UTRA NR Dual Connectivity, EN-DC, operation is supported within the area of the cell in question. The term E-UTRA is typically referred to as 4th Generation, 4G or LTE. New Radio, NR, is typically referred to as 5th Generation or 5G.

When system information is broadcast, it is generally preferable to avoid repeating the same information for Public Land Mobile Networks, PLMNs, using the same setting. However, it is not always possible to avoid a certain amount of repetition. In the context of broadcast transmissions, especially, unnecessary repetition makes poor use of finite resources.

It is an aim of embodiments of the present invention to address issues in the prior art, especially those associated with the repeated broadcast of certain information.

A second aspect of the present invention relates generally to Vehicle to Everything, V2X, Inter Radio Access Technology, IRAT, signalling. In Release 16 of the applicable standards, LTE operations were extended to NR V2X.

Figure 4:
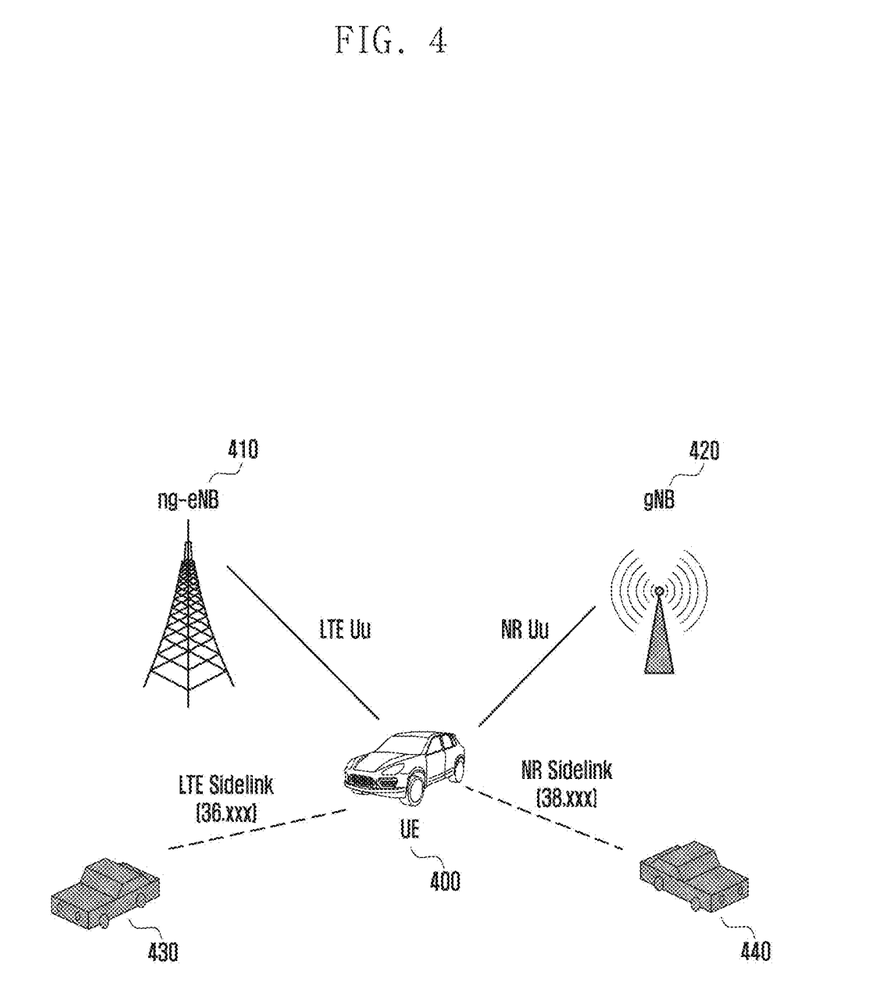
FIG. 4 shows a representation of a UE using sidelink in the context of two different RATS.

FIG. 4 shows a general view of a UE (car, 400) in communication with NR base station (410), LTE base station (420) and two other vehicles: car (430) using LTE sidelink and car (440) using NR sidelink.

In the case where a UE is connected to a first RAT e.g. LTE, it can be configured to perform sidelink communication using resources of that RAT by dedicated and broadcast signalling generated by the first RAT that controls these resources. Sidelink refers to a communication channel which enables UEs to communicate directly with other UEs, without being relayed by a base station or other relay device.

The UE is able to provide information to the network to, amongst other things, request sidelink resources, to provide Channel Busy Ratio, CBR, measurement results and assistance for Semi-Persistent Scheduling, SPS, grants. This information, provided by the UE, can assist the network in setting the configuration for sidelink communication. The network can control the information provided by the UE by a configuration specifically introduced for this purpose. Hence, the configuration that the network provides to the UE concerns a first part handling the actual sidelink communication (e.g. mode and resources to be used) and a second part handling the information that the UE provides to assist the network.

Two sidelink resource allocation modes are supported: mode 1 and mode 2. In mode 1, the sidelink resource allocation is provided by the network. In mode 2, the UE decides which of the SL transmission resources to use from a resource pool(s) configured by network.

In Release 16 of the 3GPP standard, an option was introduced that when connected to a first RAT (e.g. LTE), the UE can be configured to perform sidelink communication using resources controlled by a second, different, RAT (e.g. NR).

Solution to Problem

According to the present invention there is provided an apparatus and method as set forth in the appended claims. Other features of the invention will be apparent from the dependent claims, and the description which follows.

According to a first aspect of the present invention, there is provided a method of managing a system information parameter, broadcast by an LTE cell of a network on which a User Equipment, UE, is camping, wherein the system information parameter indicates New Radio, NR, frequency bands available for use in an EN-DC configuration, which in a case of network sharing, may be different for each of at least one sharing PLMN, and whereby the system information parameter includes an entry for each of the at least one PLMN that contains the actual NR frequency bands if: a) sharing is employed for the concerned serving cell; and b) the NR bands for which the network supports EN-DC is not the same for all of the multiple sharing PLMNs and wherein the contents of the system information parameter is not signalled if condition a) or b) is not true.

In an embodiment, the system information parameter, if broadcast, is included in the field "plmn-InfoList".

In an embodiment, the UE determines whether to display a 5G icon in response to the information received from the network.

According to a second aspect of the present invention, there is provided network arranged to perform the method of the first aspect.

According to a third aspect of the present invention, there is provided a method of transferring an IRAT configuration to a UE in a message from a first network via a first RAT, wherein the IRAT configuration includes a configuration for the UE formatted according to a second RAT and the configuration is included in an octet string.

In an embodiment, the configuration is a sidelink configuration.

In an embodiment, the message additionally includes a configuration for the UE formatted according to the first RAT.

According to a fourth aspect of the present invention, there is provided a method of transferring an IRAT configuration to a UE in a message from a first network via a first RAT, wherein the IRAT configuration includes a configuration for the UE according to a second RAT and the configuration is included in an octet string and wherein the message further includes a configuration for the UE according to the first RAT.

In an embodiment, either both the configuration for the UE according to the first RAT and the configuration for the UE according to the second RAT succeed and are implemented by the UE or, if one or more of the two configurations fails, then both configurations fail.

According to a fifth aspect of the present invention, there is provided method of transferring an IRAT configuration to a UE in a message from a first network via a first RAT, wherein the IRAT configuration includes a configuration for the UE according to a second RAT and the configuration is included in an octet string, wherein if the UE is unable to comply with the configuration, then the UE performs a re-establishment.

In an embodiment, the re-establishment is performed regardless of whether the respective message includes a reconfiguration for the first RAT.

According to a sixth aspect of the present invention, there is provided apparatus arranged to perform the method of any of the third to fifth aspects.

According to an aspect of the present invention the network is able to avoid signalling "plmn-InfoList-r16" when for all (one or multiple) PLMNs, the same set of EN-DC bands apply. As such, it is possible to avoid the need to repeatedly signal this information, resulting in more efficient use of finite signalling (broadcast) bandwidth.

In particular, if the value of "plmn-InfoList-r16" is set to a predetermined value, preferably 0, then all bands in "bandListENDC" apply for all (one or many) PLMNs listed in SIB1.

Although a few preferred embodiments of the present invention have been shown and described, it will be appreciated by those skilled in the art that various changes and modifications might be made without departing from the scope of the invention, as defined in the appended claims.

Advantageous Effects of Invention

The use of a second RAT presents difficulties in transferring the signalling concerning this second RAT and it is an aim of embodiments of the present invention to address such shortcomings, whether mentioned herein or not.

BRIEF DESCRIPTION OF DRAWINGS

For a better understanding of the invention, and to show how embodiments of the same may be carried into effect, reference will now be made, by way of example only, to the accompanying diagrammatic drawings in which.

MODE FOR THE INVENTION

Figure 1:
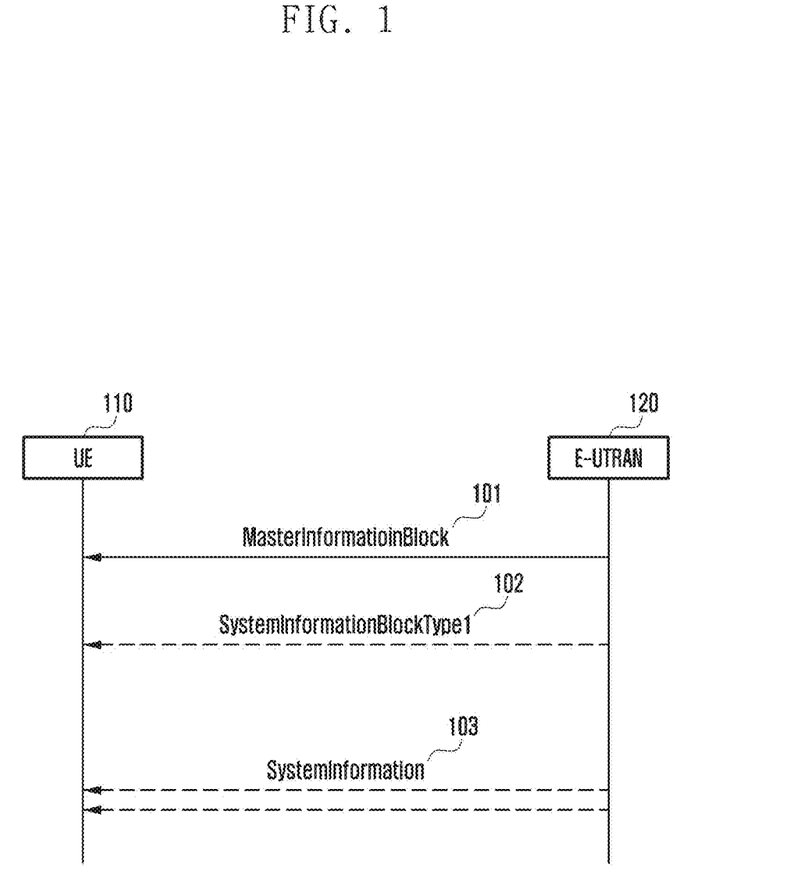
FIG. 1 shows a general representation of System Information broadcasting as known in the prior art.

FIG. 1 shows a representation of the broadcast of system information from an E-UTRAN (120) to a UE (110) at operation 101 to 103. This comprises a Master Information Block (MIB) as well as other System Information messages, as shown.

When a UE is camping on an LTE cell, its display may show a 5G icon to indicate that 5G coverage is available. In some countries, there are specific requirements regarding when a UE is allowed to display the 5G icon. As such, the display of the 5G icon may not carry exactly the same meaning in every location and may not accurately reflect the facilities available to the particular UE.

In particular, the 4G/LTE cell that the UE is camping on may support dual connectivity (DC) with specific 5G bands. This kind of dual connectivity is referred to as EN-DC (for EUTRA NR DC i.e. with LTE as the Master and NR as the Secondary node/cell group). The list of such 5G/NR bands may be broadcast in system information blocks (SIBs) by the serving cell the on which the UE is camping.

In standards definitions, a field was introduced in SIB26a for this purpose. Full details of the use of the band list are not specified, i.e. they are left to particular UE implementation. For example, one option is that if the UE supports EN-DC for at least one of the listed NR bands and is able to determine it is in coverage of the concerned band, it may display 5G icon.

The cell on which the UE camps may be shared by more than one different operator and for each PLMN, ENDC may be supported for a different set of NR bands. This means that the band list should be signalled per PLMN, since each PLMN may support EN-DC for a different set of NR bands.

As the information is broadcast periodically, this should be done in an efficient manner so that finite broadcast resources are used efficiently. For instance, when there is no sharing, or when for all PLMNs, EN-DC is supported for the same set of NR bands, one option that is possible is to not signal a bandListENDC per PLMN. Various other signalling options are possible too, including setting the size of the field "bandListENDC" equal to 0. Embodiments of the present invention encompass the above options, whereby the amount of data broadcast is effectively reduce by the omission of certain data from the broadcast or the setting of a defined filed to a particular value, preferably zero.

In the previous R15 definition, SIB2 merely included a bit indicating whether the serving cell that the UE is camping on supports 5G for a given PLMN. i.e. it was in-dependent of whether the UE was actually detecting any NR cells, let alone cells that could actually be configured for EN-DC.

One or more system information blocks (SIBx) other than SIB1 are transferred within SystemInformation messages from the network to the UE. In Release 15 of the standard, SIB2 was extended with a field "upperLayerIndication" that, according to RRC, is merely provided to upper layers. The field is signalled per PLMN.

Figure 2:
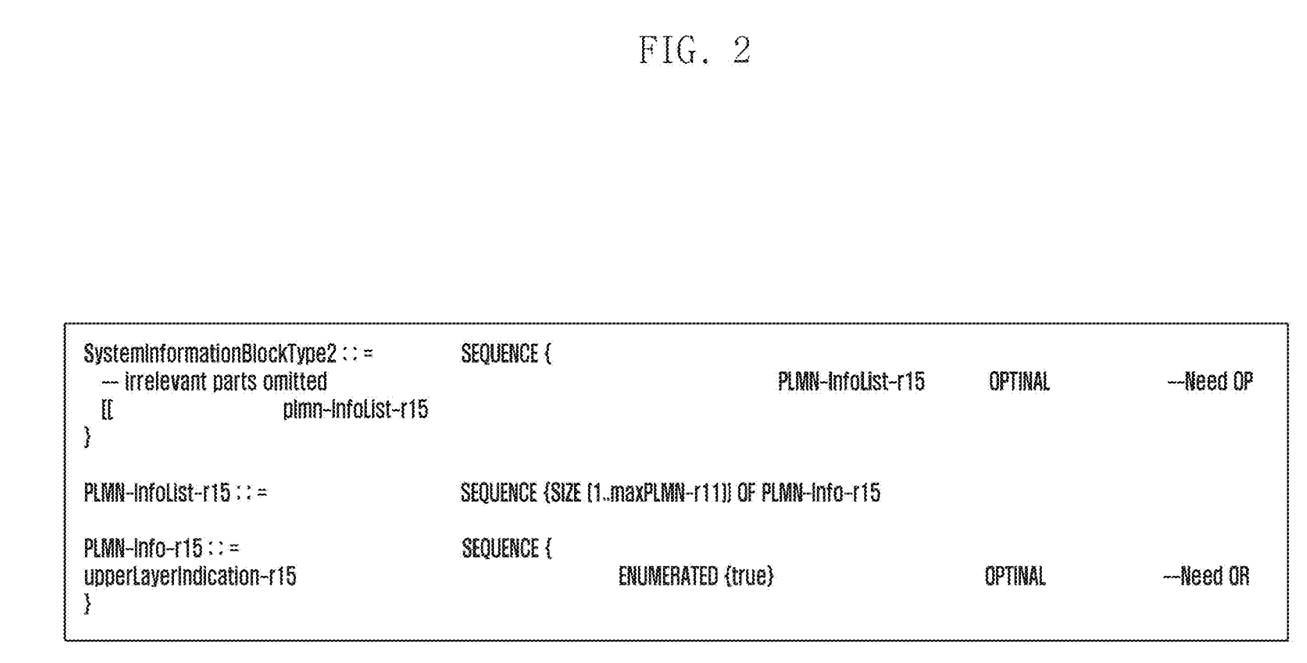
FIG. 2 shows a prior art illustration of a relevant part of SIB2, detailing PLMN information.

FIG. 2 shows a prior art illustration of a relevant part of SIB2, detailing legacy PLMN information.

Figure 3:
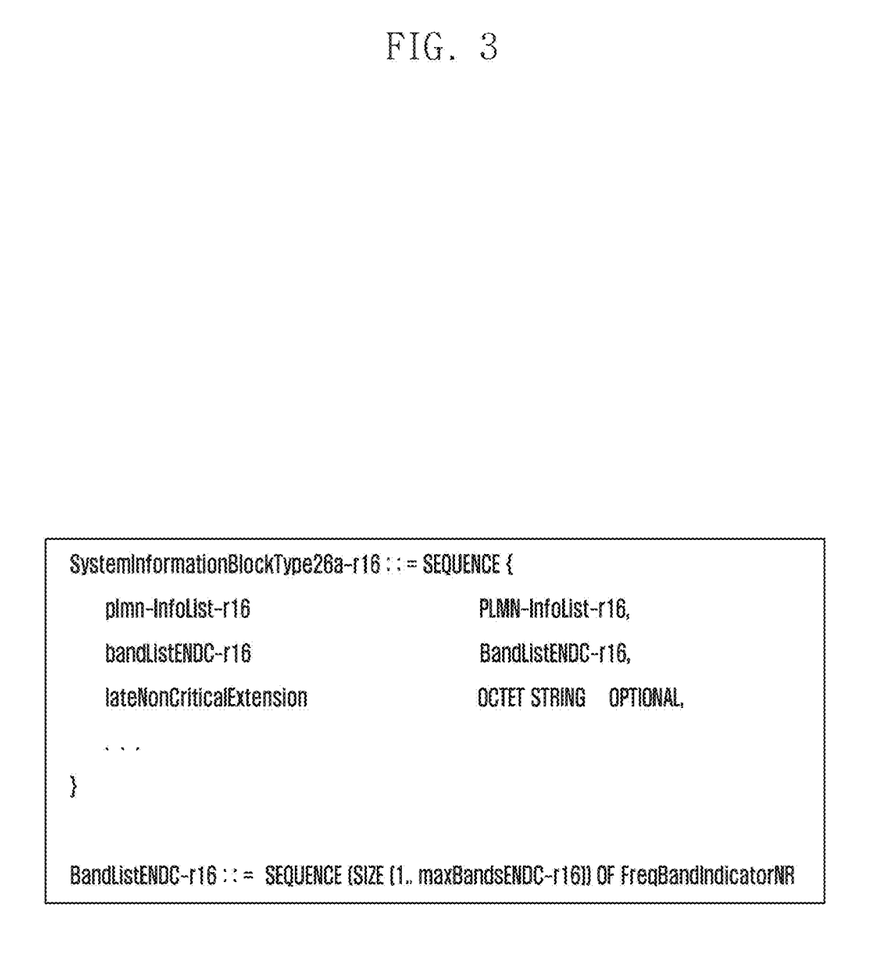
FIG. 3 shows a relevant part of "SystemInformationBlockType26a-r16" according to an embodiment of the present invention.

FIG. 3 shows a relevant part of "SystemInformationBlockType26a-r16" according to an embodiment of the present invention. The following description relates to the field descriptions included in "SystemInformationBlockType26a":

"bandListENDC": A list of NR bands which can be configured as Secondary Cell Group, SCG, in EN-DC operation with serving cell for the forwarding of "upperLayerIndication" to upper layers.

"plmn-InfoList": This field includes the same number of entries and listed in the same order as PLMNs across the "plmn-IdentityList" fields "plmn-IdentityList" and "plmn-IdentityList-r14" included in SIB1. i.e. the first entry corresponds to the first entry of the combined list that results from concatenating the entries included in the second to the original "plmn-IdentityList" field in SIB1. If the size of the field is set to 0, all bands in "bandListENDC" apply for all PLMNs listed in SIB1.

"nr-BandList": This field indicates a list of bands and is encoded as a bitmap, where the bit N is set to "1" if the current serving cell supports EN-DC operation with the N-th NR band in "bandListENDC". The bits which have no corresponding bands in "bandListENDC" shall be set to 0; bit 1 of the bitmap is the leading bit of the bit string.

By means of performing a determination as to whether the NR frequency bands for which the network supports EN-DC is the same for all of the plurality of PLMNs, then a broadcast scheme can be adopted which effectively minimises or, at least reduces, the amount of information which must be broadcast, resulting in more efficient operation since the finite broadcast resources can be used efficiently. Note that System information is common for all UEs. This means that the determination does not take into account what a particular UE supports. The band list in SIB26a concerns the list of bands for which the network supports EN-DC within coverage of the concerned cell broadcasting the information.

In other words, it is possible to reduce the size of field plmn-InfoList when either network sharing is not used or when the set of NR bands for which EN-DC is supported is the same for all PLMNs.

According to a second aspect of the invention, issues connected to V2X inter-RAT signalling are addressed. This relates to the transfer of signalling, in particular the dedicated configuration when a second RAT is involved. In such a situation, it is ap-propriate for dedicated configuration concerning the second RAT to be encoded/formatted according to the specifications defined for that second RAT (as if the UE were connected to that second RAT and received the concerned configuration directly from that RAT). Likewise, the UE can provide information concerning sidelink communication via the second RAT, for similar purposes i.e. to request sidelink resources, to provide CBR measurement results and assistance for SPS grants. The UE provides this information to the first RAT, again using the encoding/formatting according to the second RAT. The network takes the information provided by the UE into account when setting the sidelink configuration for the second RAT.

Note that sidelink communication via a second RAT does not require the UE to be connected to both the RATs i.e. the UE does not need to be in Dual Connectivity (DC). If, however, the UE is in dual connectivity, it is the Master Node that can configure the UE with sidelink communication.

According to the situation in the prior art, the first RAT signalled the configuration for sidelink communication using a second RAT by means of a number of different fields such as a field for signalling sidelink resources, a field to control information by which UE can request sidelink resources, field to control reporting by UE of CBR measurement results and UE assistance for SPS grants. As such, the Reconfiguration message according to the first RAT included several fields with configuration relating to the second RAT. Moreover, some of these fields were signalled using encoding defined for the first RAT. This rendered the process cumbersome and difficult to manage, particularly in cases where the nature of the information changes over time, resulting in further difficulties.

According to an embodiment of the invention, the configuration concerning the second RAT is carried by a field carrying the multiple configuration parts (re-) using the encoding/formatting according to the second RAT. In particular, the Reconfiguration defined for the first RAT includes a field carrying, within an octet string container, a Reconfiguration message defined for the second RAT, with the Reconfiguration according to the second RAT including the multiple configurations for sidelink communication using the second RAT. For the fields included within the Reconfiguration message according to the second RAT, the same fields may be re-used as when the network would configure the UE for sidelink communication using this RAT, if it were directly connected to this RAT.

Figure 5:
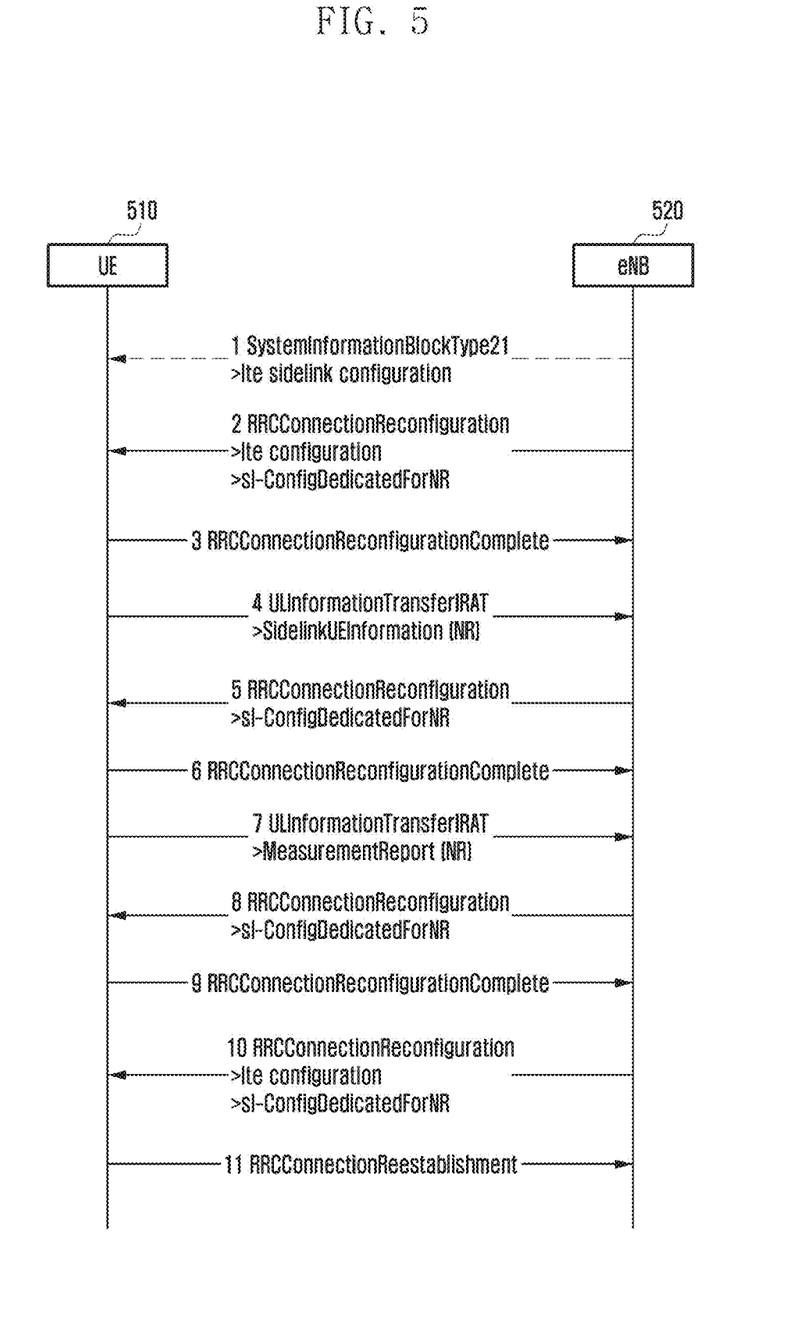
FIG. 5 shows a message flow according to an embodiment of the present invention.

FIG. 5 illustrates the message flow between UE (510) and eNB (520) as per an embodiment of the present invention. Selected steps are described below.

2: RAN node using LTE configures UE for sidelink communication via second RAT (i.e. NR) Note that the NR sidelink configuration is provided by NR Reconfiguration message, carried within octet string container, as will be described later.

4: UE requests resources for sidelink communication via second RAT

5: Network allocates the requested sidelink resources

7: UE provides SL related measurements

8: Network modifies sidelink configuration

10: Network modifies LTE and NR sidlelink configuration

11: UE fails to comply with some of the message contents and performs re-establishment, as will be described later.

Embodiments of the present invention are herein described where LTE is the first RAT while NR is the second RAT. However, this is exemplary only and other combinations are possible, such as, but not limited to, the case where NR is the first RAT and LTE is the second RAT.

The octet string in the LTE message carries the NR RRCReconfiguration message. Such an NR message covers all signalling currently required for V2X operation. By means of this, separate and/or different containers for each configuration part can be avoided. This approach can cover any extension that may be needed in future without change to LTE.

In terms of the specifics of signalling, Uplink, UL, DCCH signalling is provided covering the NR messages: MeasurementReport (CBR measurements), SidelinkUEIn-formationNR (indication of service interest) and UEAssistanceInformation (SPS grant assistance).

Downlink, DL, DCCH signalling is provided covering configuration for dedicated resource pools, measurements and UE assistance.

Figure 6:
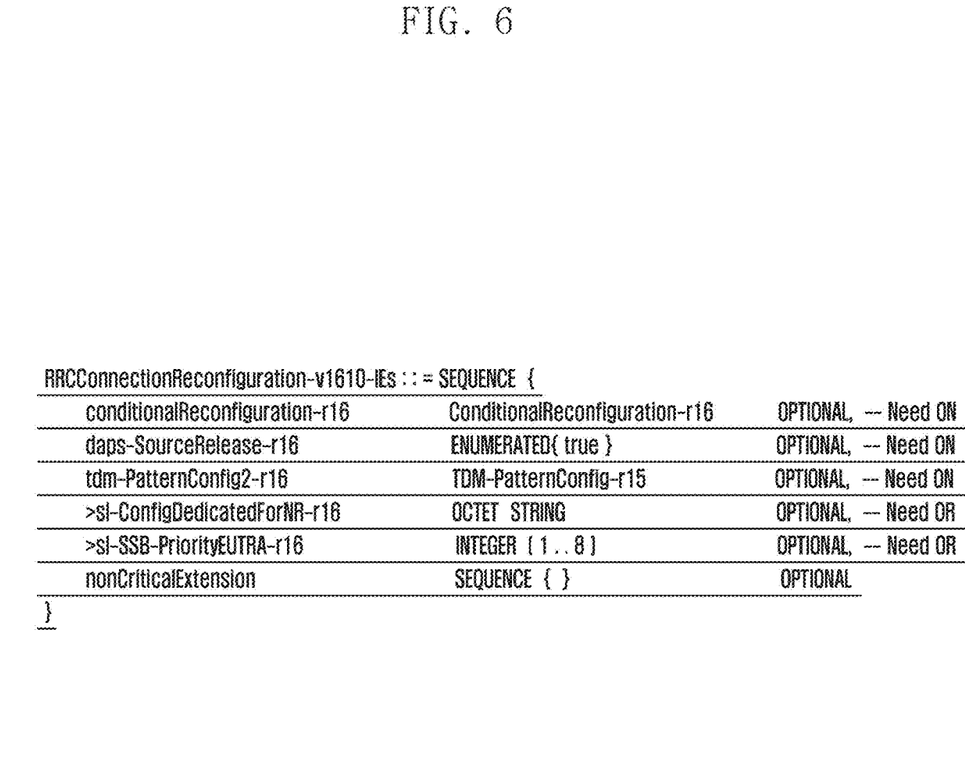
FIG. 6 shows an extract from an applicable standard specification.

FIG. 6 shows an extract from the applicable standard specification (TS 36.331) which shows the NR sideling configuration. Of particular note is the field "sl-ConfigDedicatedForNR", which is described as a container for providing the dedicated configurations for NR sidelink communication, the octet string contains the NR RRCReconfiguration message as specified in TS 38.331 [82]. In this version of the specification, the NR RRC message only includes fields related to NR sidelink communication, i.e. sl-ConfigDedicatedNR, measConfig and/or otherConfig. 1f the UE is configured by the current Pcell with sl-ScheduledConfig set to setup (i.e., NR sidelink communication mode 1), the network only includes sl-PrioritizationThres and sl-ConfiguredGrantConfig that only includes the configurations of configured sidelink grant Type 1 in the field sl-ScheduledConfig.

Embodiments of the invention offer the advantage that fields already defined in the second RAT for configuring sidelink configuration can be re-used. Moreover, if new fields are introduced in future, as the standard specification evolves, perhaps to reflect new or improved features, then these fields can be supported without having to change the signalling in the first RAT. Another advantage is that UE and network operations are simplified, due to the re-use of the signalling. In other words, the signalling received by UE for sidelink operation concerning the second RAT, and the associated processing, is the same regardless of whether or not the UE is connected to a different (first) RAT.

For a UE configured with sidelink operation as set out above, a network may, at times, need to modify the UE configuration. Such a modification may include a change to the configuration of the first RAT as well as a change to the configuration for sidelink communication using a second RAT.

According to an embodiment of the present invention, the network can perform both of these changes by means of a single Reconfiguration message. In other words, when the Reconfiguration message of the first RAT includes a Reconfiguration message of the second RAT for sidelink communication, it can also include reconfigurations concerning the first RAT.

A UE that receives such a message, including both configuration parts, may not be able to comply with some of the parts included in the message. For instance, this might occur if a particular configuration part would violate UE capabilities. In such a case, the UE cannot comply with the Reconfiguration message of the second RAT or the UE cannot comply with the modifications to the first RAT configuration.

According to an embodiment of the present invention, the UE will not accept the entire Reconfiguration message, whenever it is unable to comply with some of the configuration that is included. As such, if the UE cannot comply with the changes for sidelink communication using the second RAT it will also not perform the reconfigurations for the first RAT and vice-versa. In other words, it is not possible to have a partial success. It is only possible to have joint success/failure, where all aspects of the reconfiguration either succeed or all fail.

To further illustrate the joint success/failure feature described above, some of the UE capabilities may be shared between the dedicated LTE radio resource and the NR SL configurations. In other words, in order to enable the configuration of NR SL, the network may have to release some LTE radio resource configurations (or vice versa). For instance, baseband processing capabilities could be shared.

The following example illustrates possible operations:

The network configures NR SL and, at the same time, it releases an MCG SCell, thereby making baseband processing available for NR SL; or If the UE cannot comply with the NR SL configuration, there is no need to release the MCG SCell either. As such, the LTE and NR SL configurations should preferably have joint success/failure.

In an embodiment, the NR SL dedicated configuration is transferred in the same LTE RRC message as used for the LTE radio resource reconfiguration i.e. to enable joint success/failure.

In an embodiment, if both NR SL and LTE radio resource configurations are included in the same message, it is specified that the UE applies joint success/failure i.e. it either accepts both of the two or none of the two. In other words, the operation must completely succeed or completely fail. It is not possible for only one of the configurations to be accepted.

In a further refinement, in the event that the UE cannot comply with part of the configuration in a Reconfiguration message including both changes to the first and to the second RAT, it will perform a re-establishment of the connection.

As a further example, in the event that the UE does not comprehend the NR SL configuration contained in an LTE message, then the UE can either perform re-establishment if the same message includes an LTE reconfiguration or, preferably, the UE performs re-establishment regardless of whether or not the same message includes an LTE reconfiguration.

By means of embodiments of the invention, the transfer of configuration data is performed in a manner which is at least to some extent future proofed and ensures proper operation, with a safe default fallback mechanism in case of failure.

Figure 7:
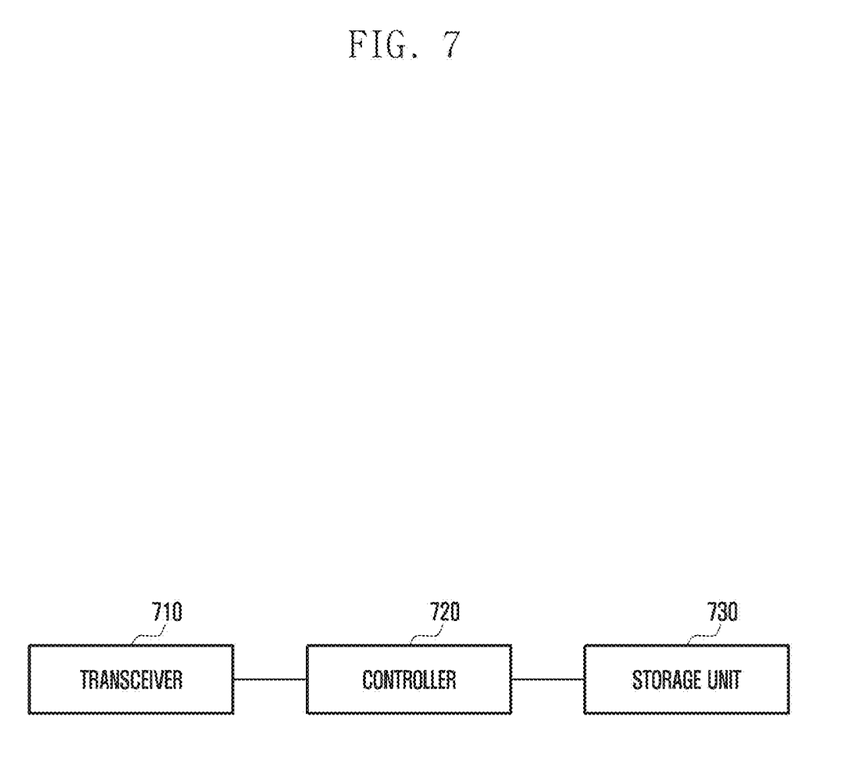
FIG. 7 shows the configuration of a user equipment according to an embodiment of the disclosure.

FIG. 7 shows the configuration of a user equipment (UE) according to an embodiment of the disclosure.

Referring to FIG. 7, the UE may include a transceiver 710, a controller 720, and a storage unit 730. In the embodiment, the controller 720 may be defined as a circuit, an application-specific integrated circuit, or at least one processor.

The transceiver 710 may transmit/receive signals to/from other network entities. The controller 720 may control overall operations of the UE according to the embodiment proposed in the disclosure. The storage unit 730 may store at least one piece of information transmitted/received through the transceiver 710 and information produced through the controller 720.

Figure 8:
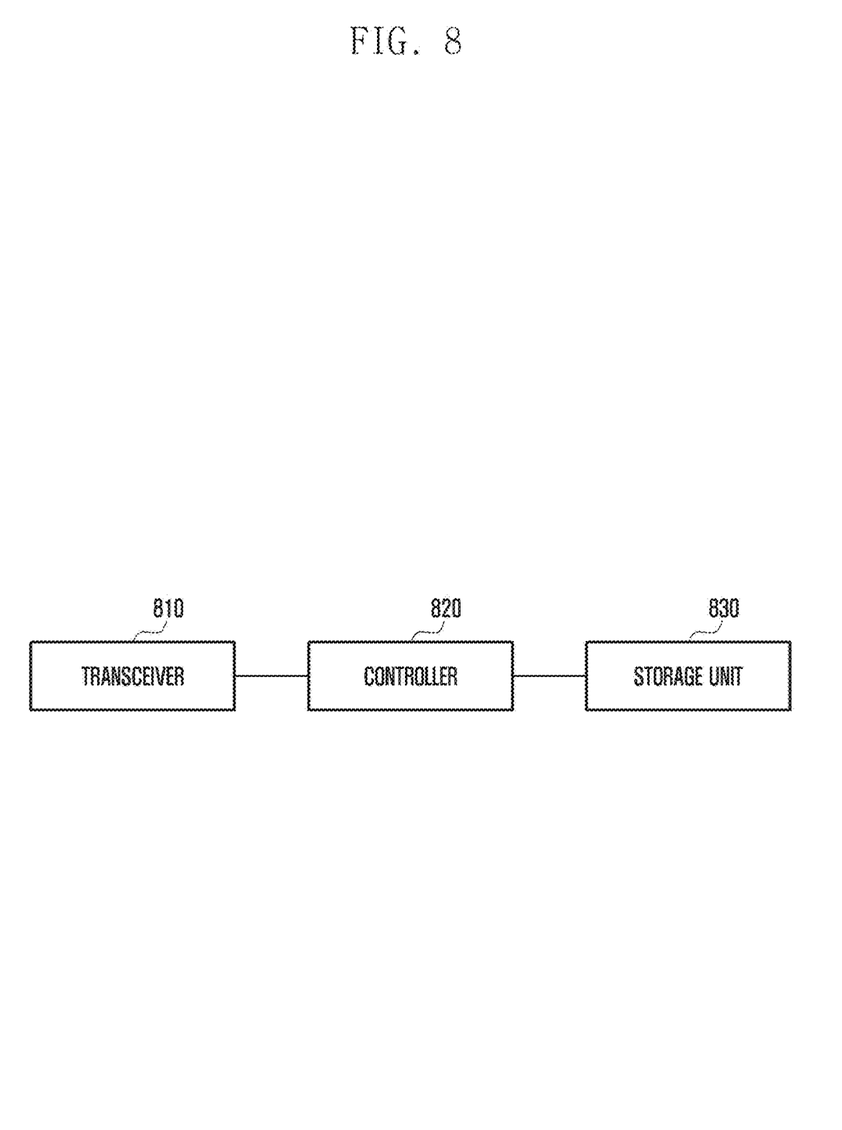
FIG. 8 shows the configuration of a base station according to an embodiment of the disclosure.

FIG. 8 shows the configuration of a base station according to an embodiment of the disclosure. The base station may correspond to the RAN node in the respective embodiments.

Referring to FIG. 8, the base station may include a transceiver 810, a controller 820, and a storage unit 830. In the embodiment, the controller 820 may be defined as a circuit, an application-specific integrated circuit, or at least one processor.

The transceiver 810 may transmit/receive signals to/from other network entities. The controller 820 may control overall operations of the base station according to the embodiment proposed in the disclosure. The storage unit 830 may store at least one piece of information transmitted/received through the transceiver 810 and information produced through the controller 820.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as ap-propriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a network in a wireless communication system, the method comprising:
broadcasting, a system information block (SIB) 26a including new radio (NR) bands and a field for a public land mobile network (PLMN),
wherein in case that a size of the field is set to 0, all bands in the NR bands apply for all PLMNs listed in an SIB1.

2. The method of claim 1,
wherein the field is plmn-InfoList.

3. The method of claim 1,
wherein the field includes nr-BandList indicating a list of bands, and
wherein the nr-BandList is encoded as a bitmap, where a bit N is set to 1 if the current serving cell supports an evolved universal terrestrial radio access new radio dual connectivity (EN-DC) operation with an N-th NR band in the NR bands, and where a bit that has no corresponding bands in the NR bands is set to 0.

4. The method of claim 1, further comprising:
identifying whether the serving cell supports an EN-DC operation.

5. A method performed by a user equipment (UE) in a wireless communication system, the method comprising:
receiving, from a network, a system information block (SIB) 26a including new radio (NR) bands and a field for a public land mobile network (PLMN) in case that a serving cell supports an evolved universal terrestrial radio access NR dual connectivity (EN-DC) operation,
wherein in case that a size of the field is set to 0, all bands in the NR bands apply for all PLMNs listed in an SIB1.

6. The method of claim 5,
wherein the field is plmn-InfoList.

7. The method of claim 5, further comprising:
identifying whether the serving cell supports the EN-DC operation.

8. The method of claim 5, wherein the field includes nr-BandList indicating a list of bands, and wherein the nr-BandList is encoded as a bitmap, where a bit N is set to 1 if the current serving cell supports the EN-DC operation with an N-th NR band in the NR bands, a bit which have no corresponding bands in the NR bands shall be set to 0.

9. A network, comprising:

a transceiver configured to transmit or receive at least one signal; and at least one processor operatively coupled to the transceiver, wherein the at least one processor is configured to:

broadcast, a system information block (SIB) 26a including new radio (NR) bands and a field for a public land mobile network (PLMN), and wherein in case that a size of the field is set to 0, all bands in the NR bands apply for all PLMNs listed in an SIB1.

10. The network of claim 9, wherein the field is plmn-InfoList.

11. The network of claim 9, wherein the field includes nr-BandList indicating a list of bands, and wherein the nr-BandList is encoded as a bitmap, where a bit N is set to 1 if the current serving cell supports the EN-DC operation with an N-th NR band in the NR bands, a bit which have no corresponding bands in the NR bands shall be set to 0.

12. The network of claim 9, wherein the at least one processor is further configured to:

identify whether the serving cell supports an evolved universal terrestrial radio access new radio dual connectivity (EN-DC) operation.

13. A user equipment (UE) comprising:

a transceiver configured to transmit or receive at least one signal; and at least one processor operatively coupled to the transceiver, wherein the at least one processor is configured to:

receive, from a network, a system information block (SIB) 26a including new radio (NR) bands and a field for a public land mobile network (PLMN) in case that a serving cell supports an evolved universal terrestrial radio access new radio dual connectivity (EN-DC) operation, and wherein in case that a size of the field is set to 0, all bands in the NR bands apply for all PLMNs listed in an SIB1.

14. The UE of claim 13, wherein the field is plmn-InfoList.

15. The UE of claim 13, wherein the at least one processor is further configured to:

identify whether the serving cell supports an EN-DC operation.

16. The UE of claim 13, wherein the field includes nr-BandList indicating a list of bands, and wherein the nr-BandList is encoded as a bitmap, where a bit N is set to 1 if the current serving cell supports the EN-DC operation with an N-th NR band in the NR bands, a bit which have no corresponding bands in the NR bands shall be set to 0.

* * * * *